United States Patent [19]

Inoue et al.

[11] 4,417,272
[45] Nov. 22, 1983

[54] COLOR TELEVISION CAMERA HAVING A COLOR SEPARATION CROSSING STRIPED FILTER

[75] Inventors: Yuzuru Inoue, Machida; Takashi Shinozaki, Yokohama; Yoshichi Otake, Kamakura; Shinsuke Ono, Yokosuka, all of Japan

[73] Assignee: Victor Company of Japan, Limited, Yokohama, Japan

[21] Appl. No.: 309,805

[22] Filed: Oct. 8, 1981

[30] Foreign Application Priority Data

Oct. 8, 1980 [JP] Japan ................. 55-140912
Oct. 9, 1980 [JP] Japan ................. 55-141312
Oct. 12, 1980 [JP] Japan ................. 55-142269

[51] Int. Cl.³ ............................. H04N 9/07
[52] U.S. Cl. ............................. 358/44
[58] Field of Search ................. 358/43, 44

[56] References Cited

U.S. PATENT DOCUMENTS 3,940,788  2/1976  Abe ........................ 358/43
4,009,939  3/1977  Okano ..................... 358/44
4,083,627  4/1978  Okano ..................... 358/44
4,318,123  3/1982  Knop ...................... 358/44

FOREIGN PATENT DOCUMENTS 43-1910    1/1968  Japan .
47-18688   6/1972  Japan .
56-147120 11/1981  Japan .

Primary Examiner—Michael A. Masinick
Attorney, Agent, or Firm—Lowe, King, Price & Becker

[57] ABSTRACT

The image of a subject imaged on the photoelectric conversion surface of a pickup tube of the color television camera is defocused in a given direction by a given amount to make a blur so that beat interference due to specific black and white pattern of the subject does not occur in the reproduced picture. In first and second embodiments of the present invention, at least one optical filter having specific characteristics is employed for defocusing the image, while in a third embodiment, an aperture stop is used to defocus the image by utilizing the aberration of the lens system of the color television camera. The aperture stop of the third embodiment may be used together with the optical filter(s) of the first and second embodiments.

8 Claims, 8 Drawing Figures

COLOR TELEVISION CAMERA HAVING A COLOR SEPARATION CROSSING STRIPED FILTER

BACKGROUND OF THE INVENTION

This invention generally relates to color television (video) cameras, and particularly the present invention relates to color television cameras having a color separation crossing striped filter in the light path thereof.

Color television cameras (television will be simply referred to as TV hereafter) are arranged to obtain a multicolor TV signal as an output signal of a pickup tube by using a color separation striped filter. This filter, having a given pattern, is positioned in the light path between the subject and the photoelectric convertion surface of a pickup tube. At the output of the filter, a signal is disclosed having a given spatial frequency in accordance with the details of the repetitive arrangement of color stripes of the color separation striped filter. The output signal of the pickup tube is in the form of a signal modulated by the color signal.

Therefore, the signal having the given spatial frequency above-mentioned color separation striped filter, interfers with a signal obtained from the subject, and thus, beat interference undesirably occurs in the reproduced picture.

Up to this time, in order to resolve this problem the above-mentioned beat interference has been removed or reduced such that, as proposed in e.g., Japanese Patent Publication 43-1910, an optical image of a subject having a applied pattern is given to the photoelectric conversion surface of the pickup tube under the condition that the image has been defocused only in the direction of the scanning line, by using a lenticular lens, phase grating plate or the like. As proposed in Japanese Utility Model Publication 47-18688, an optical image of a subject having a applied pattern is given to the photoelectric conversion surface of the pickup tube under the condition that the image has been defocused only in the direction of the scanning line, by using a flat surface of a transparent anisotropic substance (such as a flat plate of crystal). This substance develops double refraction characteristics as an optical interdigital filter. As such, the spatial frequency in accordance with the given repetitive arrangement of the color stripes of the color separation striped filter and a frequency which is an odd multiple of the spatial frequency are the peak attenuation points thereof, while zero spatial frequency and even multiples of the spatial frequency are the transmission range thereof.

The above-mentioned resolving technique is effective when the color separation striped filter has a structure such that vertically extending color stripes of the filter are arranged in the direction of the scanning line (horizontal direction) in a given repetitive order. However, when the color separation striped filter is of a crossing type, beat interference occuring in the reproduced picture cannot be satisfactorily removed or reduced because the number of patterns of a subject, which cause the occurrence of beat interference in the reproduced picture in connection with the pattern of the color separation crossing striped filter, is more than one.

SUMMARY OF THE INVENTION

The present invention has been achieved in order to remove the above-mentioned drawbacks and disadvantages inherent to the conventional color television camera having a color separation crossing striped filter.

It is, therefore, an object of the present invention to provide a color television camera which does not suffer from beat interference caused by the provision of a color separation crossing striped filter.

According to the present invention one or more optical filters and/or an aperture stop is additionally provided in the light path of the television camera. The optical filter has a particular characteristics of defocusing in a given direction by a given amount, while the aperture stop has an aperture with which defocusing by the aberration of the lens of the television camera is effected in a given direction by a given amount.

In accordance with the present invention there is provided a color television camera for generating an electrical output signal indicative of an image of a subject, comprising: (a) a lens system; (b) a pickup element responsive to the light applied through said lens system for generating said electrical signal; (c) a color separation crossing striped filter positioned in the light path of said color television camera, said color separation crossing striped filter having two sets of repetitive arrangements of parallel color stripes respectively extending in different directions, each of said two sets having repetitive color stripes of a plurality of given colors; and (d) an optical filter positioned in said light path for defocusing said image on the photoelectric conversion surface of said pickup element, said optical filter being arranged such that a blur occurs in a direction substantially normal to the extending direction of an image of one color stripe and the width of said blur is a function of Ph, wherein Ph is the length of an image of one color stripe in the direction of the scanning line in said image of one of said repetitive arrangements of said color separation crossing striped filter.

In accordance with the present invention there is also provided a color television camera for generating an electrical output signal indicative of an image of a subject, comprising: (a) a lens system; (b) a pickup element responsive to the light applied through said lens system for generating said electrical signal; (c) a color separation crossing striped filter positioned in the light path of said color television camera, said color separation crossing striped filter having two sets of repetitive arrangements of parallel color stripes respectively extending in different directions, each of said two sets having repetitive color strips of a plurality of given colors; and (d) an optical filter positioned in said light path for defocusing said image on the photoelectric conversion surface of said pickup element, said optical filter being arranged such that the direction and the width of the blur corresponds to one of diagonals of a rectangle, which is imagined such that the base thereof has a length Ph in the direction of the scanning line and each of the vertical sides thereof has a half length of Pv, wherein Ph is the length of an image of a color stripe in the scanning line direction, and Pv is the length of an image of the color stripe in the directin normal to the scanning line direction.

In accordance with the present invention there is further provided a color television camera for generating an electrical output signal indicative of an image of a subject, comprising: (a) a lens system; (b) a pickup element responsive to the light applied through said lens system for generating said electrical signal; (c) a color separation crossing striped filter positioned in the light path of said color television camera, said color separation crossing striped filter having two sets of repetitive arrangements of parallel color stripes respectively extending in different directions, each of said two sets having repetitive color stripes of a plurality of given colors; and (d) an aperture stop positioned in said light path for causing said image, which is imaged on the photoelectric conversion surface of said pickup element by said lens system, to be defocused by a given amount because of the aberration of said lens system in a specific direction related to the pattern of said color separation crossing striped filter.

BRIEF DESCRIPTION OF THE DRAWINGS

The object and features of the present invention will become more readily apparent from the following detailed description of the preferred embodiments taken in conjunction with the accompanying drawings in which.

The same or corresponding elements are designated at like reference numerals throughout the drawings.

DETAILED DESCRIPTION OF THE INVENTION

Prior to describing the embodiments of the present invention, the structure and operation of the color separation crossing striped filter used in the conventional color TV cameras will be described for a better understanding of the object and features of the present invention.

Figure 1:
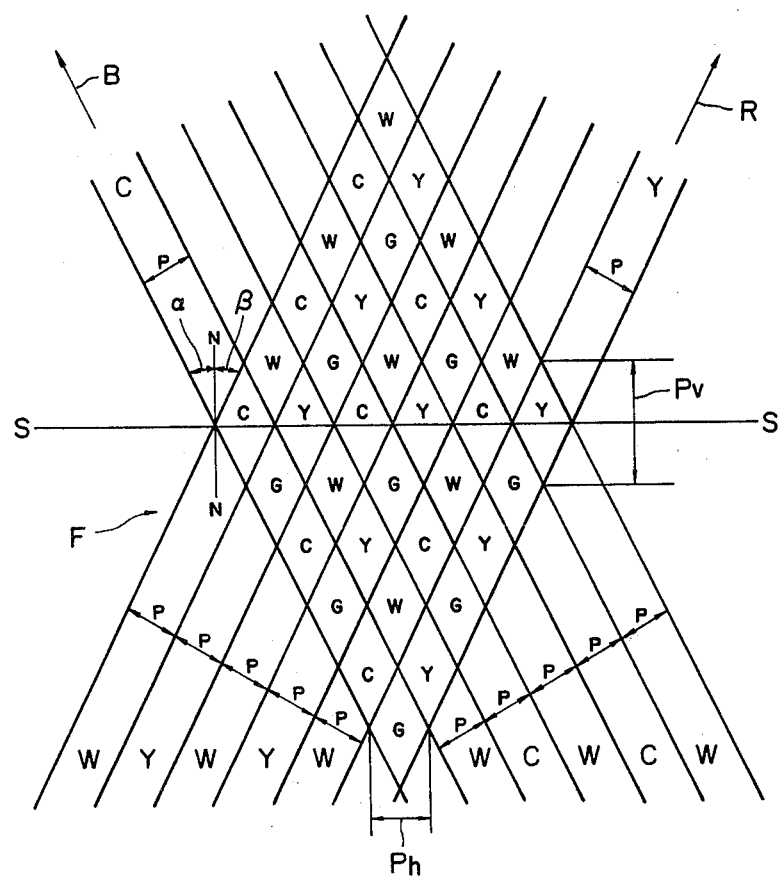
FIG. 1 is a top plan view of a portion of the color separation crossing striped filter provided in the light path of a color TV camera.

FIG. 1 is a top plan view of an example of a color separation crossing striped filter F, and in FIG. 1, the reference S—S is a line indicating the direction of the scanning line; and the reference N—N is a line indicating the direction normal to the scanning line direction S—S. In FIG. 1, the reference W designates filter stripes (color stripes W) through which all color lights can be transmitted; Y, filter stripes (color stripes Y) through which yellow light can be transmitted; and C, filter stripes (color stripes C) through which cyanic light can be transmitted. Each of the color stripes, W, Y and C has a stripe width indicated at the reference P. The color stripes Y and the color stripes W are alternatively arranged in parallel in such a manner that their extending directions equal to the direction of an arrow R which is rotated clockwise by an angle $\beta$ from the line N—N normal to the scanning line S—S. The color stripes C and the color stripes W are alternatively arranged in parallel in such a manner that their extending directions equal to the direction of an arrow B which is rotated counterclockwise by an angle $\alpha$ from the above-mentioned line N—N.

As a result, a color separation crossing striped filter F is formed by the above-mentioned two sets of repetitive arrangements, each having different extending directions R and B, of two color stripes. With the provision of the crossing or intersecting repetitive arrangements of color stripes, a repetitive filter pattern of W, G, W, G . . . in the direction of the scanning line and another repetitive filter pattern of Y, C, Y, C . . . in the direction of the scanning line alternatively appear in the direction normal to the scanning line direction. In the above, the reference G indicates green filter portions.

In the color separation crossing striped filter F of FIG. 1, the transverse or horizontal pitch of the filter pattern in the direction of the scanning line S—S and the longitudinal or vertical pitch in the direction N—N normal to the scanning line direction S—S are respectively indicated by the length Ph, measured in the scanning line direction, and by the other length Pv, measured in the direction normal to the scanning line direction, of each of the color stripes W, C or Y each having a width P. Beat interference occurs in the reproduced picture in various cases, namely, under the condition that the image of the color separation crossing striped filter F constructed of a filter pattern having a transverse pitch Ph and a longitudinal pitch Pv is applied to the photoelectric conversion surface of the picture tube, in the case that a black and white vertical-stripe pattern extending in the direction N—N normal to the the scanning line direction S—S and having a width Ph in the scanning direction is given by the subject to the photoelectric conversion surface of the pickup tube; in the case that the image of the subject applied to the photoelectric conversion surface of the pickup tube is of a black and white lateral-stripe pattern extending in the direction S—S of the scanning line and having a width of Py/2 in the direction of N—N when the space between scanning lines which scan the surface of the photoelectric conversion surface is half of the longitudinal pitch Py of the filter pattern; and in the case an image of a subject is applied to the photoelectric conversion surface of the pickup tube as a black and white oblique-stripe pattern extending in the direction B or R, in which direction the color stripes extend, and having a stripe width of Ph in the direction normal to the extending direction of the above-mentioned stripes.

Among the above-mentioned various cases causing the occurrence of beat interference, although one which occurs by the application of a vertical-stripe pattern from the subject to the photoelectric conversion surface of the pickup tube can be satisfactorily removed by the application of the conventional countermeasure, beat interferences caused by other reasons cannot be removed by the application of the above-described conventional countermeasure.

Generally speaking, since vertical-stripe patterns frequently cause the occurrence of the above-mentioned beat interference in the reproduced picture, while other patterns do not frequently appear, a color TV camera, which has been manufactured by applying the above-mentioned conventional techniques so that a specific vertical-stripe pattern of a subject does not cause the occurrence of a spurious color signal which results in the occurrence of beat interference in the reproduced picture, can be used as a practical one. However, further severe requirements in connection with the picture quality are set out in these days, and therefore, removal of beat interference by the application of only the conventional techniques is considered to be insufficient to meet the severe requirements. Namely, a better way for improving the picture quality has been desired.

The present invention has resolved the above-mentioned problem by providing, one or more optical filter and/or an aperture stop in the light path of a TV camera having a color separation crossing striped filter.

In first and second embodiments, which will be described hereafter, one or two optical filters are used to defocus the image of the subject in a given direction by a given amount, and in a third embodiment, an aperture stop is used to defocus the image of the subject in a given direction by a given amount by utilizing aberration of the lens of the color TV camera.

The optical filter used in the first embodiment causes the occurrence of a defocusing or blur on the photoelectric conversion surface of the pickup tube in the direction substantially normal to the extending direction of an image of a color strip, where the length or width of the blur is related to Ph, wherein Ph is the length of an image of one color stripe in the direction of the scanning line in an image of repetitive arrangement of color stripes of a plurality of given colors selected from an image of repetitive arrangements of two sets of repetitive color stripes of a plurality of given colors, having different extending directions from each other. The details of the optical filter used in the first embodiment color TV camera according to the present invention will be described hereinbelow.

Figure 2:
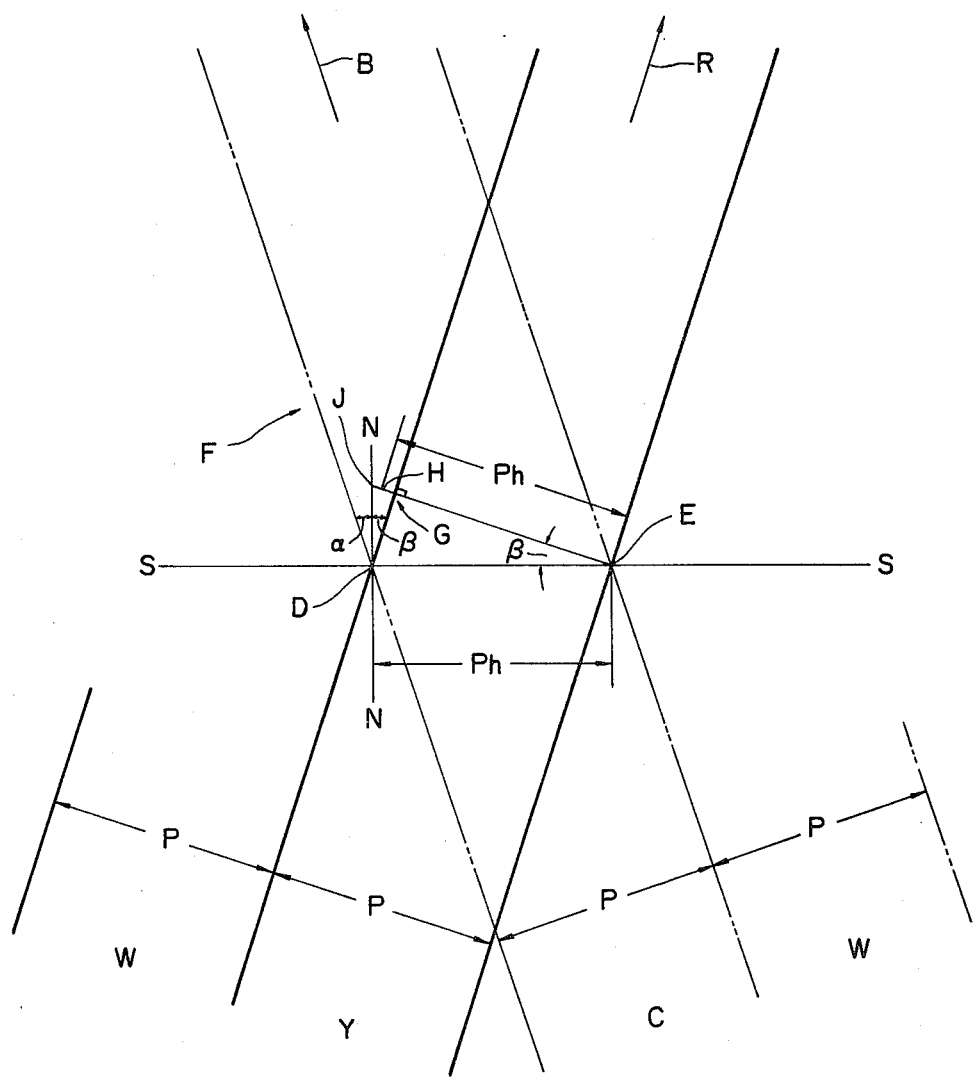
FIGS. 2 and 3 are enlarged top plan views of a portion of the color separation crossing striped filter of FIG. 1 for the description of the constructional principle of the first embodiment of the present invention.
Figure 3:
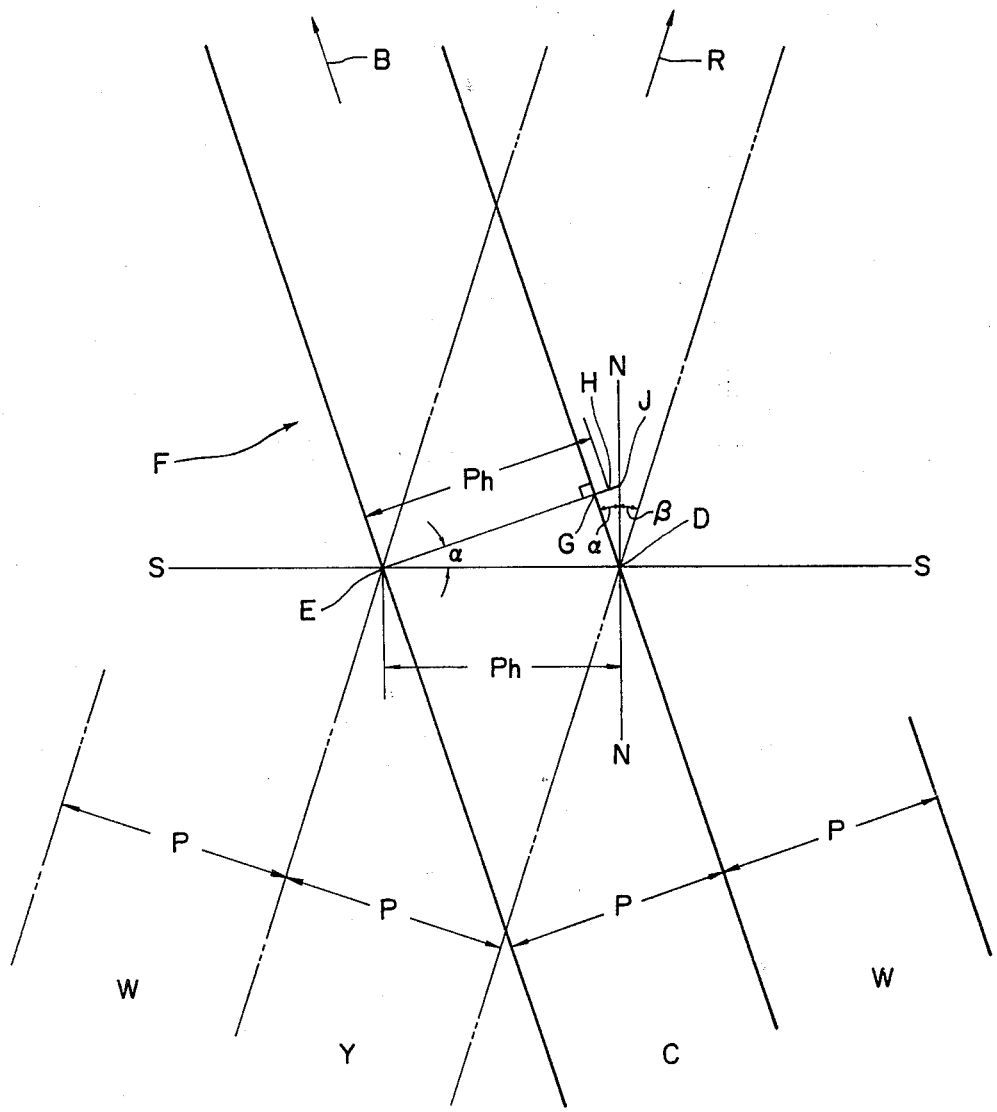

Hence, reference is now made to FIGS. 2 and 3 which are explanatory diagrams for the description of the defocusing direction and the defocusing width given to the image of the subject, which is to be appeared on the photoelectric conversion surface of the pickup tube, by the optical filter provided in the light path leading to the photoelectric conversion surface of the pickup tube in the first embodiment color TV camera according to the present invention. These diagrams are enlarged views of a portion of the color separation crossing striped filter F of FIG. 1, and the references W, Y and C are color stripes; S—S, scanning line direction; and N—N, a direction normal to the scanning line direction S—S.

The color separation crossing striped filter F is constructed of two sets of color stripe arrangements, i.e. a first set of color stripes Y, W, Y . . . whose extending direction is indicated by an arrow R, and a second set of color stripes C, W, C . . . whose extending direction is indicated by an arrow B, as described in the above. Each of the color stripes Y, W, Y . . . whose direction is R and the width is P is inclined clockwise by an angle $\beta$ from the direction N—N which is normal to the scanning line direction S—S, while each of the color stripes C, W, C . . . whose direction is B and the width is P is inclined counterclockwise by an angle $\alpha$ from the direction N—N which is normal to the scanning line direction S—S.

The length $\overline{DE}$=Ph, in the scanning line direction S—S, of each of the color stripes W, Y and C, whose width is P, can be expressed in terms of Ph=P/cos $\beta$ with reference to FIG. 2 in connection with each of the stripes Y and W whose extending direction is R, and in terms of Ph=P/cos $\alpha$ with reference to FIG. 3 in connection with each of the stripes C and W whose extending direction is B. In FIG. 2 (or FIG. 3), a line E–J is a line indicating a direction normal to the extending direction R (or B) of a specific color strip, and $\overline{EG}$ indicates the width P of each color strip. Since the above-mentioned $\alpha$ and $\beta$ of a color separation crossing striped filter F are usually equal to each other, these angles $\alpha$ and $\beta$ may be represented by $\theta$.

In the first embodiment of the invention, an optical filter, which is capable of defocusing an image of a subject on the photoelectric conversion surface of the pickup tube in the direction of the line E–J, namely in the direction normal to the extending direction of each strip, by a given amount, is provided in the light path leading to the photoelectric conversion surface of the pickup tube, and the defocusing width in the above-mentioned direction by the above-mentioned optical filter provided in the first embodiment may be set to either $\overline{EH}$=Ph or $\overline{EJ}$=Ph/cos $\beta$ (or $\overline{EJ}$=Ph/cos $\alpha$). Moreover, the defocusing width may be selected at a value between Ph and Ph/cos $\theta$ wherein $\theta$=$\alpha$, or $\beta$ if desired.

In the case that the defocusing width of $\overline{EH}$=Ph is given, in the direction of the line E–J, to the image of the subject on the photoelectric conversion surface of the pickup tube by the above-mentioned optical filter, beat interference does not occur in the reproduced picture even if a black and white oblique-stripe pattern extending in the direction of the extending direction of the color stripes is applied to the photoelectric conversion surface of a pickup tube as the image of the subject. In the case that the defocusing width of $\overline{EJ}$=Ph/cos $\beta$ or $\overline{EJ}$=Ph/cos $\alpha$ is given, in the direction of the line E–J, to the image of the subject on the photoelectric conversion surface of the pickup tube by the above-mentioned optical filter, beat interference does not occur in the reproduced picture even if a black and white vertical-strip pattern extending in the direction N—N normal to the scanning line direction S—S is applied to the photoelectric conversion surface of a pickup tube as the image of the subject. Furthermore, in the latter case, even if black and white oblique-stripe pattern extending in the same direction as the extending direction of the color stripes is applied to the photoelectric conversion surface of the pickup tube as the image of the subject, beat interference is remarkably reduced.

As the above-mentioned optical filter, one or both of an optical filter which gives a given defocusing width in the direction normal to the color stripes extending in the direction R, and an optical filter which gives a given defocusing width in the direction normal to the color stripes extending in the direction B may be provided. In the case that only one optical filter between these two is provided, it is preferable to provide an optical filter which gives a given defocusing width in the direction normal to the color stripes extending in the direction R in view of visual characteristics of human being.

Figure 4:
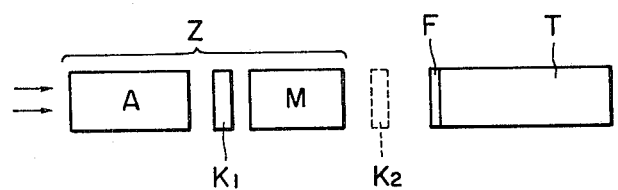
FIG. 4 is a block diagram showing the brief structure of the color TV camera according to the present invention.

FIG. 4 is a block diagram showing the brief construction of the first embodiment color TV camera according to the present invention. (FIG. 4 also shows the following second embodiment of the present invention.) In FIG. 4, the reference T is a pickup element (for instance, pickup tube, solid pickup element); F, the color separation crossing striped filter; Z, a zoom lens system; A, an afocul lens system; M, a master lens system; and K1 (K2), the optical filter(s) used in the first embodiment of the present invention. Namely, the optical filter K1 (K2) is one which is capable of defocusing the image of a subject applied to photoelectric conversion surface of the pickup tube in the direction of the line E–J (the direction normal to the extending direction of each color strip) by the above-mentioned given amount.

In FIG. 4, one of the two optical filters is shown by dotted lines because the optical filter used for practicing the present invention may be provided at one or both of the positions K1 and K2 of FIG. 4. At the position K2 of FIG. 4, any sort of optical filter, such as a crystal filter, a lenticular lens, phase grating plate, biprism or the like, may be used if it has the above-mentioned characteristics. However, it is necessary to provide an optical filter other than a crystal filter as one used at the position K1 of FIG. 4. The crystal filter, lenticular lens, phase grating plate and biprism are well known. As one example of a suitable crystal filter, see Japanese Utility Model publication 47-18688. As suitable lenticular lenses, those described in Japanese publication 43-1910, U.S. Pat. No. 4,318,123 and 3,940,788 may be used. As a phase granting plate, those described in Japanese Patent publication 43-1910 and U.S. Pat. No. 4,083,627, 3,940,788 and 4,009,939 may be used. As an example of a suitable biprism, the one disclosed in Japanese Patent publication 56-147120 may be used.

In practicing the first embodiment, an auxiliary optical filter or an optical means may be also used in addition to the above-mentioned optical filter K1 (K2) so that beat interference occurring in the reproduced picture caused by a striped pattern of a specific direction of a subject may be removed.

The direction and the width of defocusing effected by the optical filter used in the first embodiment may be changed so that the a different way of defocusing can be actualized. In the following second embodiment of the present invention, the direction and the width of defocusing are respectively changed from those of the optical filter used in the first embodiment.

Figure 5:
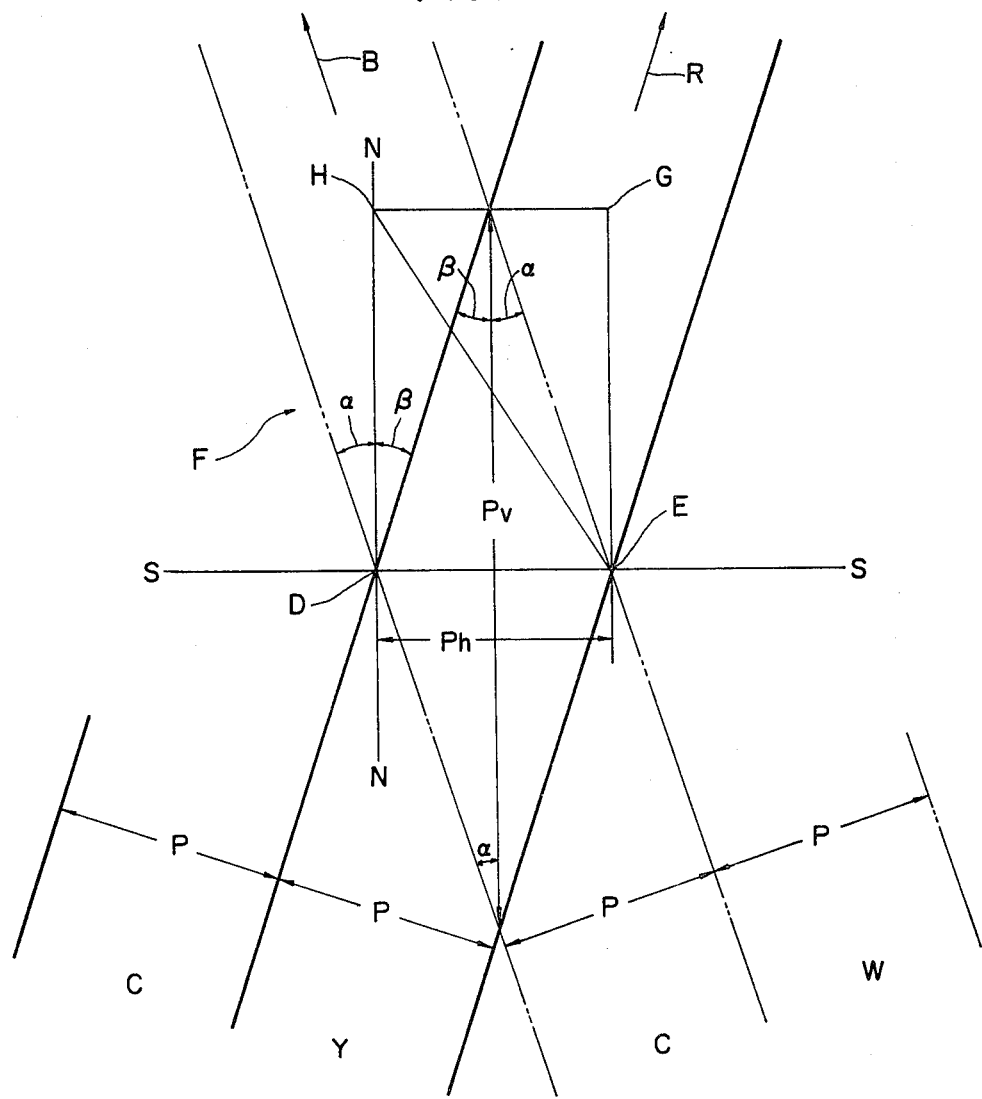
FIGS. 5 and 6 are enlarged top plan views of a portion of the color separation crossing striped filter of FIG. 1 for the description of the constructional principle of the second embodiment of the present invention.
Figure 6:
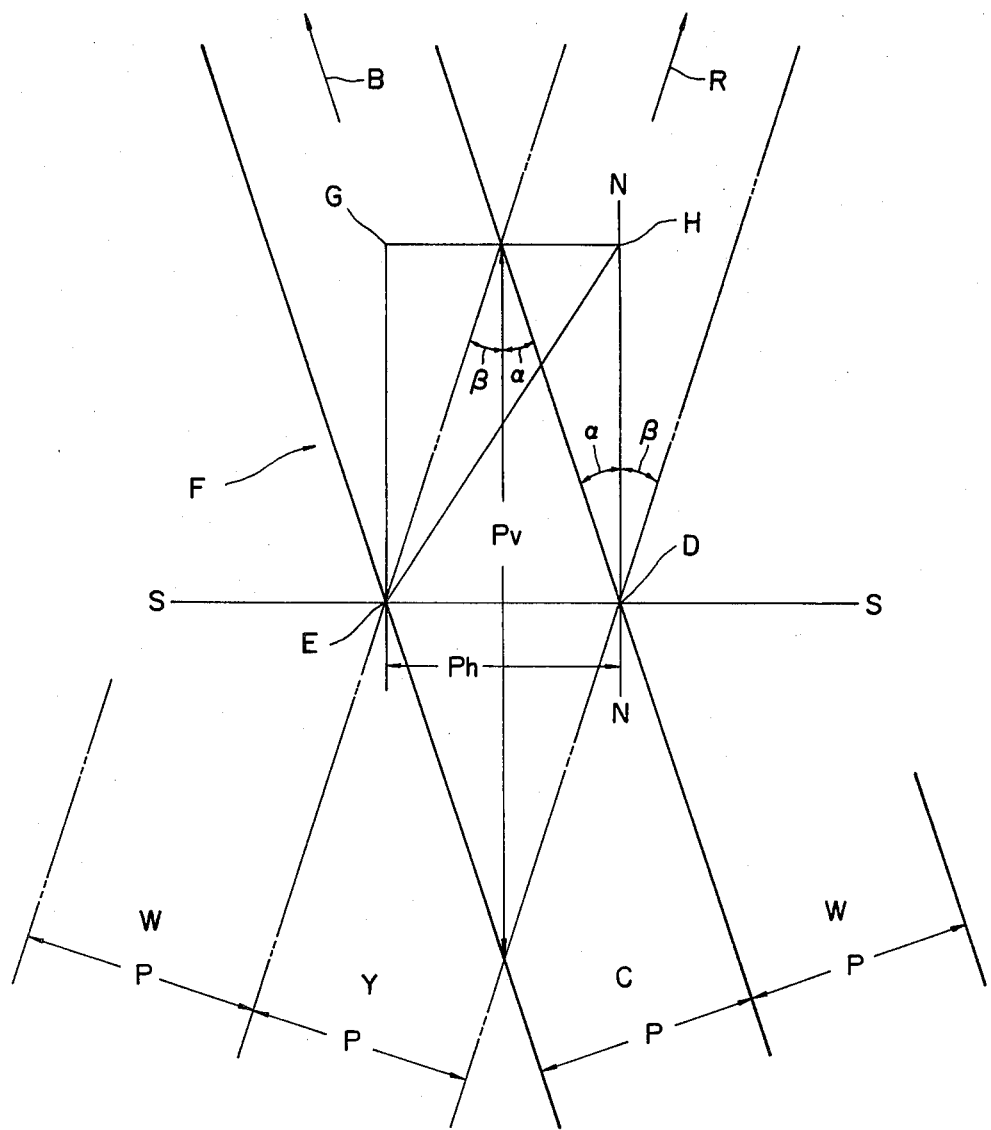

Hence, reference is now made to FIGS. 5 and 6 which are explanatory diagrams for the description of the defocusing direction and the defocusing width given to the image of the subject, which is to be appeared on the photoelectric conversion surface of the pickup tube, by the optical filter provided in the light path to the photoelectric conversion surface of the pickup tube in the color TV camera according to the present invention. These diagrams are enlarged views of a portion of the color separation crossing striped filter F of FIG. 1, and the references W, Y and C are color stripes; S—S, scanning line direction; and N—N, a direction normal to the scanning line direction S—S.

As described in the above with reference to FIG. 1, the color separation crossing striped filter F is constructed of two sets of color stripe arrangements, i.e. the color stripes Y, W, Y . . . whose extending direction is the direction R, and the color stripes C, W, C . . . whose extending direction is the direction B, as described in the above. Each of the color stripes Y, W, Y . . . whose direction is R and the width is P is inclined clockwise by an angle $\beta$ from the direction N—N which is normal to the scanning line direction S—S, while each of the color stripes C, W, C . . . whose direction is B and the width is P is inclined counterclockwise by an angle $\alpha$ from the direction N—N which is normal to the scanning line direction S—S.

The length $\overline{DE}=Ph$, in the scanning line direction S—S, of each of the color stripes W, Y and C, whose width is P, can be expressed in terms of $Ph=P/\cos\beta$ with reference to FIG. 5 in connection with each of the stripes Y and W whose extending direction is R, and in terms of $Ph=P/\cos\alpha$ with reference to FIG. 6 in connection with each of the stripes C and W whose extending direction is B.

Assuming that $\alpha=\beta$ for simplicity, the length Pv of each color stripe in the direction N—N normal to the scanning line direction S—S is given by $Pv=Ph \cot \beta=Ph \cot \alpha$, (in a regular color separation crossing striped filter, $\beta=\alpha$).

The above-mentioned Ph is the pitch (transverse pitch Ph) of the color separation crossing striped filter F in the scanning line direction S—S, while Pv is the pitch (longitudinal pitch) of the color separation crossing striped filter F in the direction N—N normal to the scanning line direction S—S.

Let us imagine a rectangle DEGH, in FIGS. 5 and 6, having a base whose length is Ph in the direction of the scanning line direction S—S and vertical sides each having a length of Pv/2. When an optical filter, which is capable of giving the image of a subject imaged on the photoelectric conversion surface of a pickup tube, a blur whose defocusing width corresponds to the length of the diagonal $\overline{EH}$ of the rectangle DEGH, in the direction of the segment $\overline{EH}$, is provided in the light path leading to the photoelectric conversion surface of the pickup tube, the image of the subject on the photoelectric conversion surface of the pickup tube will be defocused in the scanning line direction by the transverse pitch Ph, and in the direction normal to the scanning line direction by the longitudinal pitch Pv.

Since the interval between adjacent scanning lines in the pickup element, has been selected at one half of the above-mentioned longitudinal pitch Pv, provision of an optical filter having the above-mentioned characteristics in the light patch leading to the photoelectric conversion surface of the pickup tube satisfactorily removes any beat interferences which tend to occur in the reproduced picture due to a vertical-stripe pattern subject, whose pitch is Ph, and due to a horizontal-stripe pattern subject, whose pitch is Pv/2.

The optical filter used in the above-described second embodiment color TV camera according to the present invention, may be located at the position K1 and/or K2 of FIG. 4 in the same manner as in the first embodiment. Namely, the optical filters K1 and/or K2 used in the second embodiment is one which is capable of defocusing the image of a subject applied to photoelectric conversion surface of the pickup tube in the scanning line direction S—S by the transverse pitch Ph, and in the direction N—N normal to the scanning line direction S—S by one half of the longitudinal pitch Pv.

At the position K2 of FIG. 4, any sort of optical filter, such as a crystal filter, a lenticular lens, phase grating plate, biprism or the like, may be used if it has the above-mentioned characterstics of defocusing. However, a crystal filter cannot be used as an optical filter used at the position K1 of FIG. 4. An auxiliary optical filter or an optical means may be also used in addition to the above-mentioned optical filters K1 and/or K2 in the same manner as in the first embodiment so that beat interference occurring in the reproduced picture caused by a striped pattern of a specific direction of a subject may be removed.

Although in the above-described first and second embodiments, one or more optical filter is used to defocus the image of a subject in the above-described manner, an aperture stop may be used in place of such one or more optical filter. It is well known that a lens used for imaging a subject on the photoelectric conversion surface of a pickup tube has aberration to some extent, and therefore, a blur occurs in the image of the subject imaged on the photoelectric conversion surface of a pickup tube in accordance with the degree of the aberration of the lens, and that the defocusing degree becomes lower, when considering a single lens, as an aperture stop is diaphragmed since aberration can be improved as the aperture stop is diaphragmed from a fully open state.

Paying attention to the fact that a blur occurs, as described in the above, due to aberration of the lens, the third embodiment of the present invention contemplates to remove or reduce beat interference due to interference between the pattern of a subject and the pattern of the color separation crossing striped filter by giving directivity to the blur of the image caused by the aberration of the lens. To this end, directivity is given to the shape of an aperture stop provided in the light path of the color TV camera.

Figure 7:
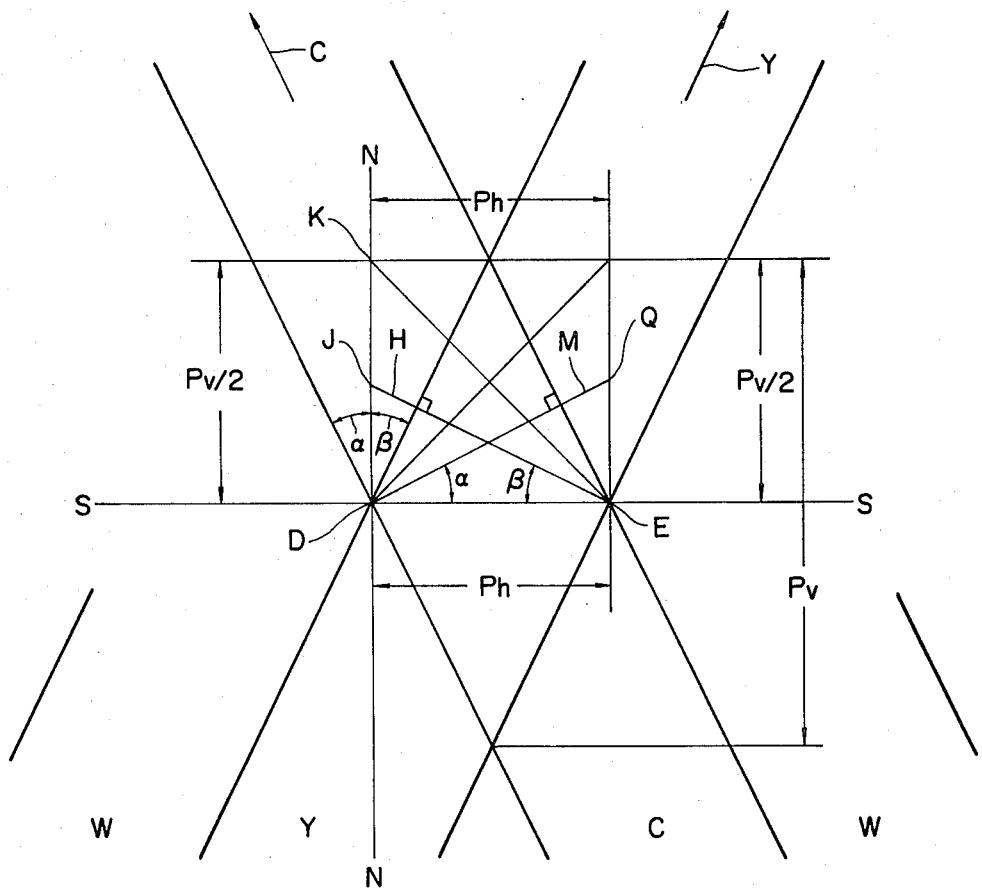
FIG. 7 is an enlarged top plan view of a portion of the color separation crossing striped filter of FIG. 1 for the description of the constructional principle of the third embodiment of the present invention.

FIG. 7 is an enlarged view of the color separation crossing striped filter F of FIG. 1, and in FIG. 7, the references S—S, N—N, Y, C, W, P, Ph, Pv, $\alpha$, $\beta$ and etc are the same as those in FIG. 1.

The pattern of a subject, which causes the occurrence of beat interference in the reproduced picture with the pattern of a color separation crossing striped filter F, are, as described with reference to FIG. 1, a vertical-stripe pattern whose pitch is Ph, a lateral-stripe pattern whose pitch is PV/2, and an oblique-strip pattern having a pitch of Pv/2 and extending in the direction R or B. The direction and width of the blur, which should be given to the image of the subject on the photoelectric conversion surface of the pickup tube in order to remove the interference occurring in the reproduced picture due to the above-mentioned various patterns of the images of subjects, are the width of $\overline{DE}$=Ph in the direction of the scanning line direction S—S, the width of $\overline{DK}$=Pv/2 in the direction N—N normal to the scanning line direction S—S, the width $\overline{EH}$=Ph in the direction normal to the color stripe extending in the direction R, and the width $\overline{DM}$=Ph in the direction normal to the color stripe extending in the direction B.

Although it is necessary to defocus the image in the above-mentioned various directions to completely remove the beat interference in the reproduced picture, desired resolution would not be obtained if defocusing in these various directions were effected.

Therefore, in practicing the third embodiment, the direction and the width of blur given to the image of a subject are set, when expressed in terms of segments of lines in FIG. 7, such that the blur given to the image of the subject corresponds to one of the segment $\overline{DE}$, the segment $\overline{DK}$, the segment $\overline{EH}$ and the segment $\overline{DM}$ so that the beat interference occurring due to a specific pattern of a subject can be removed; or the blur given to the image of a subject corresponds to the segment $\overline{EJ}$ or the segment $\overline{DQ}$ so that beat interference due to a specific vertical-stripe pattern of an image of a subject can be removed, while the beat interference due to a specific oblique-stripe pattern of an image of a subject extending in the direction R or B can be reduced; or in the case that the image of the subject has a specific vertical-stripe pattern and a lateral-stripe pattern, both of beat interferences are removed in such a manner that the blur given to the image of a subject corresponds to the segment $\overline{EK}$.

In order to cause a blur having the above-mentioned direction and width to occur in the image of a subject, an aperture stop having a shape of diaphragm, which produces a circle of least confusion extending in a desired direction, may be used.

In addition to the use of the above-mentioned aperture stop, means for blocking light passing through the center of a lens may be used (for instance, a mask may be provided at the center of the lens; a point mirror for reflecting the light toward the view finder side may be provided in the vicinity of the center of the lens in the case of a TTL system; the dividing ratio of the light may be controlled by a half-silvered mirror in place of a point mirror; or an ND filter may be provided at the center of the lens in place of the above-mentioned mask).

Figure 8:
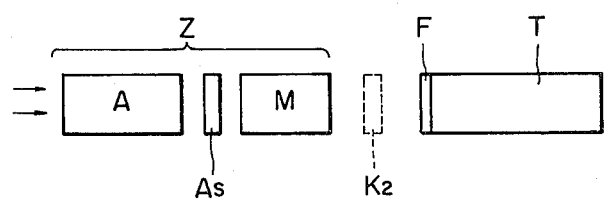
FIG. 8 is a block diagram showing the brief structure of the third embodiment color TV camera according to the present invention.

FIG. 8 is a block diagram showing the brief construction of a color TV camera, and the same references as in FIG. 4 designate the same or corresponding elements. The aperture stop used in the third embodiment is designated at the reference AS and is located at a given point in the lens system including the afocul lens system A and the master lens system M of FIG. 8.

As indicated by the reference K2 in FIG. 8, the optical filter used in the above-described first and second embodiments may be used in addition to the aperture stop AS. Namely, an optical filter made of a lenticular lens, a phase grating plate, a biprism or the like may be placed in the light path when it is desired to remove beat interference due to striped pattern of a specific direction of the image of a subject, which cannot be removed by the provision of the aperture stop AS of the third embodiment. In other words, the third embodiment may be combined with one of the first and second embodiments so that one or more optical filter of the first or second embodiment may be used together with the aperture stop of the third embodiment.

As described in the above, in the color TV camera according to the present invention, the conventional problem inherent to the color TV camera provided with a color separation crossing striped filter can be satisfactorily removed, and the present invention can readily provide a color TV camera in which beat interference does not occur in the reproduced picture.

The above-described embodiments are just examples of the present invention, and therefore, it will be apparent for those skilled in the art that many modifications and variations may be made without departing from the spirit of the present invention.

What is claimed is:

1. A color television camera for generating an electrical output signal indicative of an image of a subject, comprising:
    (a) a lens system;
    (b) a pickup element responsive to the light applied through said lens system for generating said electrical signal;
    (c) a color separation crossing striped filter positioned in the light path of said color television camera, said color separation crossing striped filter having two sets of repetitive arrangements of parallel color stripes respectively extending in different directions, each of said two sets having repetitive color stripes of a plurality of given colors; and
    (d) an optical filter positioned in said light path for defocusing said image on the photoelectric conversion surface of said pickup element, said optical filter being arranged such that a blur occurs in a direction substantially normal to the extending direction of an image of one color stripe and the width of said blur is a function of Ph, wherein Ph is the length of an image of one color stripe in the direction of the scanning line in said image of one of said repetitive arrangements of said color separation crossing striped filter.

2. A color television camera as claimed in claim 1, wherein said width of blur substantially corresponds to said Ph.

3. A color television camera as claimed in claim 1, wherein said width of blur substantially corresponds to Ph/cos $\theta$, wherein $\theta$ is an angle between the direction of the scanning line on the photoelectric conversion surface of said pickup element and the direction to be defocused.

4. A color television camera for generating an electrical output signal indicative of an image of a subject, comprising:
(a) a lens system;
(b) a pickup element responsive to the light applied through said lens system for generating said electrical signal;
(c) a color separation crossing striped filter positioned in the light path of said color television camera, said color separation crossing striped filter having two sets of repetitive arrangements of parallel color stripes respectively extending in different directions, each of said two sets having repetitive color stripes of a plurality of given colors; and
(d) an optical filter positioned in said light path for defocusing said image on the photoelectric conversion surface of said pickup element, said optical filter being arranged such that the direction and the width of the blur corresponds to one of diagonals of a rectangle, which is imagined such that the base thereof has a length Ph in the direction of the scanning line and each of the vertical sides thereof has a half length of Pv, wherein Ph is the length of an image of a color stripe in the scanning line direction, and Pv is the length of an image of the color stripe in the direction normal to the scanning line direction.

5. A color television camera for generating an electrical output signal indicative of an image of a subject, comprising:
(a) a lens system;
(b) a pickup element responsive to the light applied through said lens system for generating said electrical signal;
(c) a color separation crossing striped filter positioned in the light path of said color television camera, said color separation crossing striped filter having two sets of repetitive arrangements of parallel color stripes respectively extending in different directions, each of said two sets having repetitive color stripes of a plurality of given colors; and
(d) an aperture stop positioned in said light path for causing said image, which is imaged on the photoelectric conversion surface of said pickup element by said lens system, to be defocused by a given amount in a specific direction related to the pattern of said color separation crossing striped filter.

6. A color television camera as claimed in claim 1 or 4, further comprising an aperture stop positioned in said light path for causing said image, which is imaged on the photoelectric conversion surface of said pickup element by said lens system, to be defocused by a given amount in a specific direction related to the pattern of said color separation crossing striped filter.

7. A color television camera as claimed in claim 5, wherein said aperture stop is located close to said lens system, and comprises an opening which extends in said specific direction so that the effective diameter of said filter is larger in said specific direction than in a direction normal to said specific direction.

8. A color television camera as claimed in claim 6, wherein said aperture stop is located close to said lens system, and comprises an opening which extends in said specific direction so that the effective diameter of said filter is larger in said specific direction than in a direction normal to said specific direction.

* * * * *